United States Patent
Kumar et al.

(10) Patent No.: US 10,915,693 B2
(45) Date of Patent: *Feb. 9, 2021

(54) SYSTEM AND METHOD FOR IMPLEMENTING VERIFICATION IP FOR PRE-SILICON FUNCTIONAL VERIFICATION OF A LAYERED PROTOCOL

(71) Applicant: SILICONCH SYSTEMS PVT LTD, Karnataka (IN)

(72) Inventors: Kaustubh Kumar, Bengaluru (IN); Pavitra Balasubramanian, Bengaluru (IN)

(73) Assignee: SILICONCH SYSTEMS PVT LTD, Karnataka (IN)

( * ) Notice: Subject to any disclaimer, the term of this patent is extended or adjusted under 35 U.S.C. 154(b) by 0 days.

This patent is subject to a terminal disclaimer.

(21) Appl. No.: 17/010,643

(22) Filed: Sep. 2, 2020

(65) Prior Publication Data
US 2020/0401754 A1 Dec. 24, 2020

Related U.S. Application Data

(63) Continuation of application No. 16/370,654, filed on Mar. 29, 2019, now Pat. No. 10,803,228.

(51) Int. Cl.
*G06F 30/398* (2020.01)
*G06F 30/394* (2020.01)
(Continued)

(52) U.S. Cl.
CPC ..... *G06F 30/398* (2020.01); *G01R 31/31704* (2013.01); *G06F 30/394* (2020.01); *G06F 2115/08* (2020.01)

(58) Field of Classification Search
CPC .................................................. G06F 30/398
(Continued)

(56) References Cited

U.S. PATENT DOCUMENTS

2005/0022143 A1* 1/2005 Butts ............... G06F 30/33
716/102

OTHER PUBLICATIONS

Universal Serial Bus Type-C Cable and Connector Specification Release 2.0, USB 3.0 Promoter Group, Aug. 2019 (373 pages).
(Continued)

*Primary Examiner* — Eric D Lee
(74) *Attorney, Agent, or Firm* — Procopio, Cory, Hargreaves & Savitch LLP

(57) ABSTRACT

An embodiment herein provides a method for implementing verification IP for pre-silicon functional verification of a layered protocol. The method includes generating serially connected layer blocks. A layer block includes modular components that may be enabled or disabled to change a functionality of the layer block. The modular components include a layer core, a stimulus handler, one or more transmit routers and one or more receive routers. The layer core implements the complete functionality of the layer block. The stimulus handler drives input stimulus transactions into the layer core of the layer block. The one or more transmit routers routes one or more transmit core transactions from the layer core to the connected succeeding layer block. The one or more receive routers routes one or more receive core transactions from the succeeding layer block to the layer core.

12 Claims, 13 Drawing Sheets

(51) Int. Cl.
*G01R 31/317* (2006.01)
*G06F 115/08* (2020.01)

(58) Field of Classification Search
USPC .......................................................... 716/111
See application file for complete search history.

(56) References Cited

OTHER PUBLICATIONS

Universal Serial Bus Power Delivery Specification, Revision 3.0, Version 2.0, Aug. 29, 2019 (657 pages).

* cited by examiner

SYSTEM AND METHOD FOR IMPLEMENTING VERIFICATION IP FOR PRE-SILICON FUNCTIONAL VERIFICATION OF A LAYERED PROTOCOL

CROSS REFERENCE TO RELATED APPLICATIONS

This application is a Continuation of U.S. application Ser. No. 16/370,654, filed on Mar. 29, 2019, herein incorporated by reference in its entirety.

BACKGROUND

Technical Field

The embodiments herein generally relate to the field of computer aided semiconductor design verification, and, more particularly, to a system and method for implementing verification IP for pre-silicon functional verification of a layered protocol.

Description of the Related Art

In general, a layered protocol divides the complete functionality of the protocol into a series of layers, where each layer has the property that it only uses the functions of the layer below, and only exports functionality to the layer above. A system for implementing verification IP for the layered protocol needs to be scalable to different number of layers, reusable for verification of individual protocol layers or complete series of layers, controllable, configurable per layer level and over the functionality implemented within each layer, so that desired scenarios can be generated and modular for easier maintenance and upgrade of the Verification IP. The existing system for implementing the verification IP for the layered protocol has the limitations of scalability, controllability, modularity and configurability of the layer block. The popularly used verification methodologies (i.e. Open verification methodology/universal verification methodology) recommend sequencer layering method to implement the verification IP which does not give controllability for directly accessing and tweaking transactions in middle layer while the preceding layer block is driving. Further the sequencer layering method is not modular and easy to reuse. The open verification methodology/universal verification methodology further uses layered driver method for common implementations of the verification IP. The layered driver method has the drawback of limited controllability and modularity. Both the sequencer layering and driver layering methods are not scalable enough to enable any one of the layer blocks to connect to design under test through design under test interface.

Accordingly, there remains a need for an improved system which is modular, scalable and reusable for any number of layers in the layered protocol and observable and controllable per layer for enabling generation of desired scenarios.

SUMMARY

In view of a foregoing, an embodiment herein provides a method for implementing verification IP for pre-silicon functional verification of a layered protocol. The method includes generating serially connected layer blocks. A layer block of the serially connected layer blocks implements a functionality of a layer of the layered protocol. The serially connected layer blocks are configurable to scale down to any subset of the layers of the layered protocol. Output traffic of the layer block is controlled or modified directly at the layer. The layer block includes modular components that may be enabled or disabled to change a functionality of the layer block. The modular components include a layer core, a stimulus handler, one or more transmit routers and one or more receive routers. The layer core implements the complete functionality of the layer block. The stimulus handler drives input stimulus transactions into the layer core of the layer block. The input stimulus transactions are output transactions from the stimulus handler to the layer core. The one or more transmit routers routes one or more transmit core transactions from the layer core to the connected succeeding layer block. The one or more transmit core transactions are transactions from the layer core to the one or more transmit routers. The transmit router includes a lateral controller that controls or modifies the output traffic of the layer block before communicating to a layer block that is below the layer block. The one or more receive routers routes one or more receive core transactions from the succeeding layer block to the layer core. The one or more receive core transactions are transactions from the succeeding layer block to the one or more receive routers.

In one embodiment, the verification IP receives at least one of (i) a input stimulus transaction or (ii) a universal verification methodology sequence or an open verification methodology sequence that includes the input stimulus transactions, at a topmost layer of the layered protocol; and receives at least one of (i) a lateral transaction or (ii) a universal verification methodology lateral sequence or an open verification methodology lateral sequence that includes the one or more lateral transactions, at any of the layer blocks of the layered protocol. The verification IP includes the serially connected layer blocks.

In another embodiment, the verification IP includes a scalable construction that is adapted to (i) enable or disable at least one layer block of the serially connected layer blocks individually; (ii) enable any one layer block of the serially connected layer blocks to function as a bottom most layer block; (iii) enable any one layer block of the serially connected layer blocks to function as a top most layer block; and (iv) enable layer blocks except the bottom most layer block and the top most layer block to function as middle layer blocks. The bottom most layer block is connected to a design under test interface. The bottom most layer block drives outputs and receives inputs at a signal level. The top most layer block is connected to a stimulus generator. The middle layer blocks are connected to one another using one or more blocking transaction level model interfaces that are adapted to (i) drive one or more outputs and (ii) receive one or more inputs at a transaction level.

In yet another embodiment, the output traffic of the layer block is controlled or modified directly at the layer by performing operations that includes (i) inserting one of the lateral transaction in between a stream of the transmit core transactions of output traffic of the layer block; (ii) replacing at least one of the transmit core transactions in the output traffic of the layer block with one of the lateral transactions; and (iii) dropping at least one of the transmit core transactions in the output traffic of the layer block.

In yet another embodiment, the verification IP is implemented using hardware verification language. The hardware verification language supports object oriented programming and at least one verification methodology. The verification methodology supports transaction level modeling as supported by the universal verification methodology or the open verification methodology.

In yet another embodiment, the layer core includes a transaction level model, one or more blocking transaction level model ports and one or more blocking transaction level model port implementations. The transaction level model implements respective functions of the layer of the layered protocol. The one or more blocking transaction level model ports outputs the transmit core transactions from the layer core of the layer block to at least one of (a) the one or more transmit routers or (b) a layer block above the layer block. The one or more of blocking transaction level model port implementations inputs the receive core transactions to the layer core of the layer block from at least one of (a) the one or more receive routers or (b) the stimulus Handler or (c) the layer block above the layer block of the layered protocol.

In yet another embodiment, the stimulus handler provides at least one of the universal verification methodology or the open verification methodology sequencer-driver pair based on verification methodology used to drive at least one of (i) the input stimulus transaction or (ii) the universal verification methodology sequence or the open verification methodology sequence on the layered protocol.

In yet another embodiment, the one or more transmit routers routes one or more transmit core transactions from the layer core to passive subscribers. In yet another embodiment, the one or more receive routers routes one or more receive core transactions from the succeeding layer block to the passive subscribers.

In yet another embodiment, the transmit router further includes a lateral controller, a transmit blocking transaction level model port implementation, a transmit blocking transaction level model port, a transmit transaction level model analysis port and a transmit procedure. The lateral controller controls or modifies the output traffic of the layer block before communicating to a layer block that is below the layer block. The transmit blocking transaction level model port implementation that inputs the transmit core transactions from the layer core that is connected to the transmit router. The transmit blocking transaction level model port that outputs one or more transmit out transactions from the lateral controller to the layer block that is below the layer block. The transmit transaction level model analysis port that outputs the one or more transmit out transactions to the passive subscribers connected to the transmit router. The transmit procedure that receives a handle of the one or more transmit out transactions from the lateral controller as input and converts the one or more transmit out transactions into signal level transitions on the design under test interface and a transmit configuration mechanism. The transmit configuration mechanism includes a first transmit configuration field, a second transmit configuration field and a third transmit configuration field. The first transmit configuration field enables transmitting the transmit out transactions in at least one of (i) the signal level or (ii) the transaction level, and disables the blocking transaction level model port and enables the design under test interface respectively. The second transmit configuration field enables or disables the transaction level model analysis port. The third transmit configuration field enables or disables the lateral controller.

In yet another embodiment, the receive router further includes a receive blocking transaction level model port implementation, a receive blocking transaction level model port, a receive transaction level model analysis port, a receive procedure and a receive configuration mechanism. The receive configuration mechanism includes a first receive configuration field and a second receive configuration field. The receive blocking transaction level model port implementation inputs the one or more receive core transactions from the connected succeeding layer block. The receive blocking transaction level model port outputs the one or more receive core transactions to the connected layer core. The receive transaction level model analysis port broadcasts the one or more receive core transactions to the passive subscribers that are connected to the receive router. The receive procedure obtains the design under test interface as input and converts the transitions of said design under test interface to the one or more receive core transactions. The first receive configuration field enables receiving the receive core transactions from the design under test interface or from the transaction level and disables the receive blocking transaction level model port implementation and enables the receive procedure respectively. The second receive configuration field that enables or disables the receive transaction level model analysis port.

In one aspect, a verification IP system for pre-silicon functional verification of a layered protocol, the verification IP system includes a memory and a processor that executes serially connected layer blocks. The layer block of the serially connected layer blocks implements a functionality of a layer of the layered protocol. The layer block includes modular components that are enabled or disabled to change a functionality of the layer block. The modular components include a layer block, a stimulus handler, one or more transmit routers and one or more receive routers. The layer core implements a complete functionality of the layer block. The stimulus handler that drives input stimulus transactions into the layer core of the layer block. The input stimulus transactions are output transactions from the stimulus handler to the layer core. The one or more transmit routers routes transmit core transactions from the layer core to at least one of (a) a connected succeeding layer block and (b) passive subscribers. The one or more transmit core transactions are transactions from the layer core to the one or more transmit routers. The one or more receive routers routes one or more receive core transactions from the succeeding layer block to the layer core. The one or more receive core transactions are transactions from the succeeding layer block to the one or more receive routers and the passive subscribers. A stimulus generator provides at least one of (i) one or more input stimulus transaction or (ii) a universal verification methodology sequence or an open verification methodology sequence to the layered protocol. A lateral stimulus generator provides at least one of (i) one or more lateral transaction or (ii) a universal verification methodology lateral sequence or an open verification methodology lateral sequence to the layered protocol.

In another aspect, one or more non-transitory computer readable storage mediums storing one or more sequences of instructions, which when executed by one or more processors, causes implementing a verification IP for pre-silicon functional verification of a layered protocol, by generating serially connected layer blocks. A layer block of the serially connected layer blocks implements a functionality of a layer of said layered protocol. The serially connected layer blocks are configurable to scale down to any subset of layers of the layered protocol. Output traffic of the layer block is controlled or modified directly at the layer. The layer block comprises modular components that are enabled or disabled to change a functionality of the layer block. The modular components include a layer core, a stimulus handler, one or more transmit routers and one or more receive routers. The layer core implements a complete functionality of the layer block. The stimulus handler drives input stimulus transactions into the layer core of the layer block. The input stimulus transactions are output transactions from the stimulus handler to the layer core. The one or more transmit routers routes one or more transmit core transactions from the layer core to a connected succeeding layer block. The one or more transmit core transactions are transactions to the one or more transmit routers. The transmit router includes a lateral controller that controls or modifies the output traffic of the layer block before communicating to a layer block that is below the layer block. The one or more receive routers routes one or more receive core transactions from the succeeding layer block to the layer core. The one or more receive core transactions are transactions from the succeeding layer block to the one or more receive routers.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
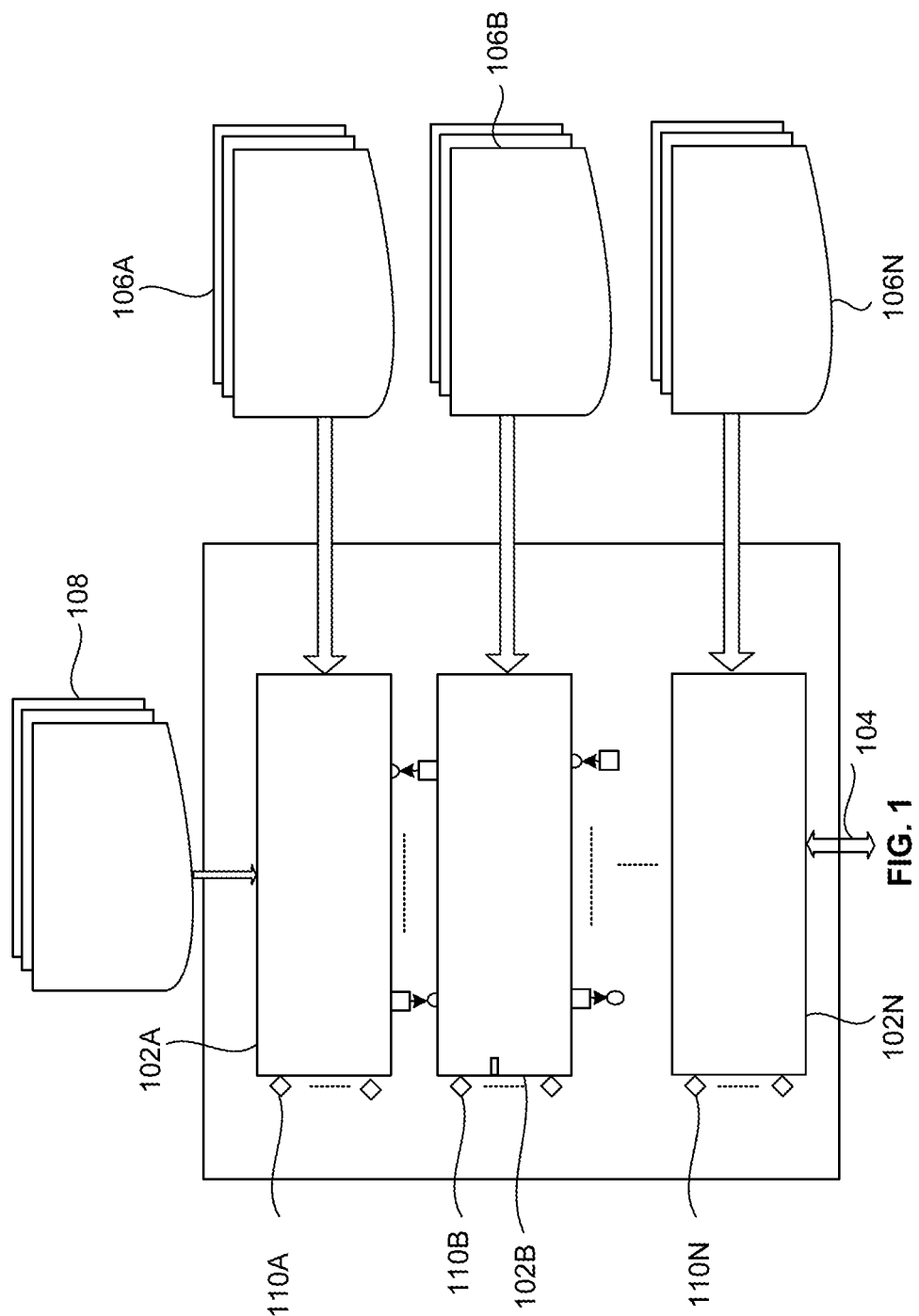
FIG. 1 illustrates a functional block diagram of architecture for implementing verification IP for a layered protocol, according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for an improved architecture that is modular, scalable and reusable for implementing verification IP for a layered protocol. The embodiments herein achieve this by providing a system for implementing verification IP for pre-silicon functional verification of the layered protocol. Referring now to the drawings, and more particularly to FIGS. 1 through 11, where similar reference characters denote corresponding features consistently throughout the figures, there are shown preferred embodiments.

FIG. 1 illustrates a functional block diagram of architecture for implementing verification IP for a layered protocol, according to an embodiment herein. The architecture includes one or more layer blocks 102A-N, design under test interface 104, one or more lateral stimulus generator 106A-N, a stimulus generator 108 and one or more transaction level model analysis ports 110A-N. The one or more layer blocks 102A-N are connected to one another to form a serially connected layer blocks 102A-N. Each layer block of the serially connected layer blocks 102A-N implements a complete functionality of a layer of the layered protocol. One layer block of the serially connected layer blocks 102A-N functions as a top most layer block 102A. The top most layer block 102A is connected to the stimulus generator 108. The stimulus generator 108 provides at least one of (i) one or more input stimulus transaction or (ii) a universal verification methodology sequence or an open verification methodology sequence to the layered protocol. One layer block of the serially connected layer blocks 102A-N functions as a bottom most layer block 102N. The bottom most layer block 102N is connected to the design under test interface 104. The bottom most layer block 102N further drives outputs and receives inputs at a signal level. The serially connected layer blocks 102A-N except the top most layer block 102A and the bottom most layer block 102N function as middle layer blocks. The middle layer blocks are connected to one another using one or more blocking transaction level model interfaces that are adapted to (i) drive one or more outputs and (ii) receive one or more inputs at a transaction level. Each layer block of the serially connected layer blocks 102A-N includes the one or more transaction level model analysis ports 110A-N that connects to passive subscribers. Each layer block of the serially connected layer blocks 102A-N further enables driving at least one of (i) one or more lateral transactions or (ii) universal verification methodology lateral sequence or open verification methodology lateral sequence, using a lateral stimulus generator of the one or more lateral stimulus generator 106A-N. The one or more lateral stimulus generators 106A-N includes at least one of (i) a lateral transaction level model first in first out queue structure or (ii) lateral open verification methodology/universal verification methodology sequencer when respective verification methodologies are used.

Figure 2:
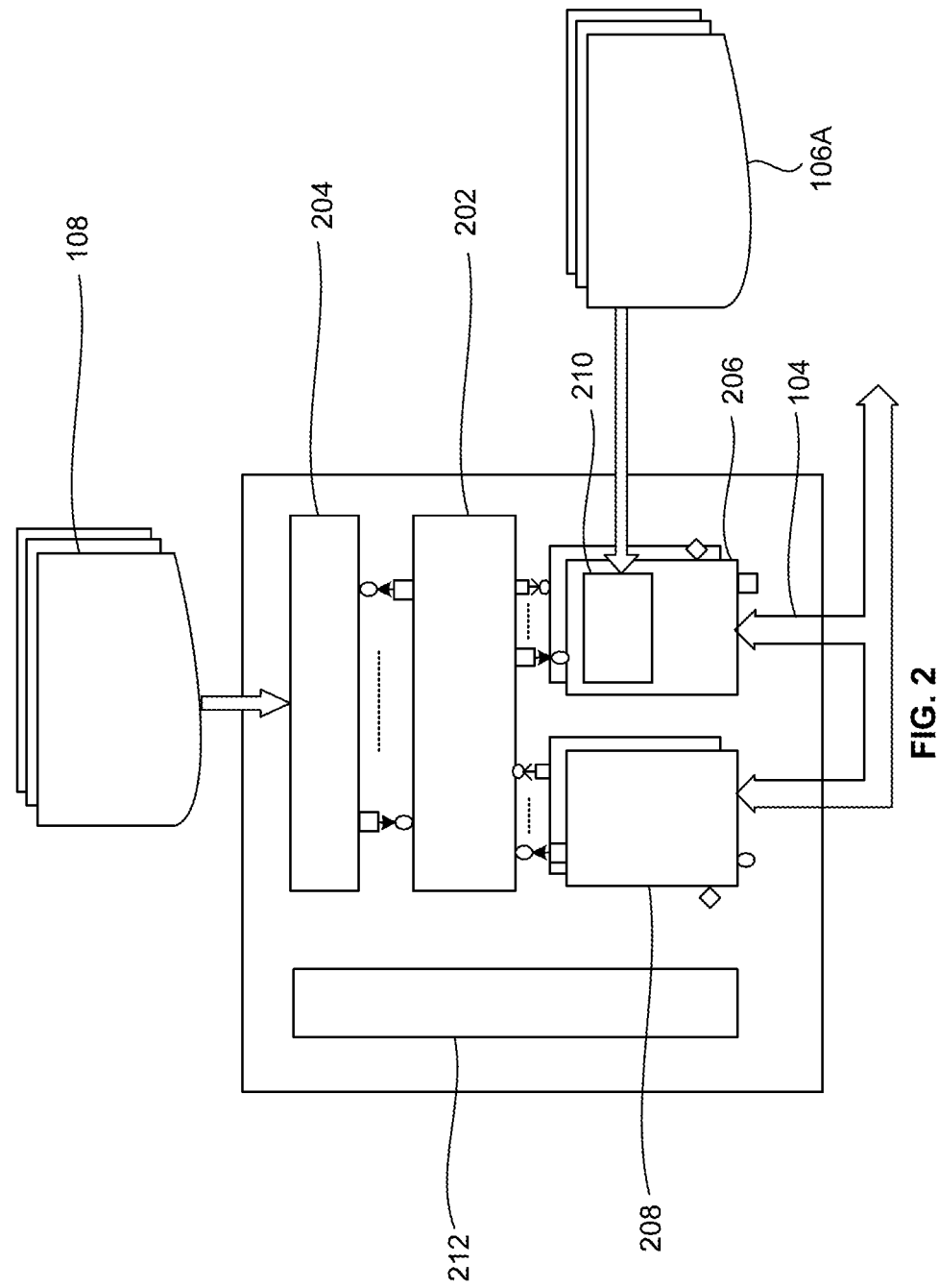
FIG. 2 illustrates a functional block diagram of a layer block of serially connected layer blocks of FIG. 1 according to an embodiment herein.

FIG. 2 illustrates a functional block diagram of a layer bock of serially connected layer blocks 102A-N of FIG. 1 according to an embodiment herein. The layer block includes a layer core 202, a stimulus handler 204, one or more transmit routers 206, one or more receive routers 208 and a layer configuration class 212. The layer core 202 implements the complete functionality of the layer block. The stimulus handler 204 drives input stimulus transactions into the layer core 202 of the layer block. The input stimulus transactions are output transactions from the stimulus handler 204 to the layer core 202. The one or more transmit routers 206 routes one or more transmit core transactions from the layer core 202 to at least one of (a) the connected succeeding layer block and/or (b) the passive subscribers. The one or more transmit core transactions are transactions from the layer core 202 to the one or more transmit routers 206. The one or more transmit routers 206 includes a lateral controller 210. The lateral controller 210 controls or modifies the output traffic of the layer block before communicating to a layer block that is below the layer block. The one or more receive routers 208 routes one or more receive core transactions from the succeeding layer block to at least one of (a) the layer core 202 and/or (b) the passive subscribers. The one or more receive core transactions are transactions from the succeeding layer block to the one or more receive routers 208.

The layer configuration class 212 includes a layer_position field, an is_active field, a dis_tx_ana_port, a dis_rx_ana_port, and a dis_lat_control. The layer_position field indicates the position of the layer block of the serially connected layer blocks 102A-N in the verification IP. The layer_position field holds three values top, middle and bottom. The layer configuration class 212 enables the stimulus handler 204, and disables the design under test interface 104 exposed by the one or more receive routers 208 and the one or more transmit routers 206, when the layer_position field holds the value top. The layer configuration class 212 disables the stimulus handler 204 and the design under test interface 104 exposed by the one or more receive routers 208 and the one or more transmit routers 206, when the layer_position field holds the value middle. The layer configuration class 212 disables the stimulus handler 204, the blocking transaction level model ports and the blocking transaction level model port implementations of the one or more receive routers 208 and the one or more transmit routers 206, and enables the design under test interface 104 exposed by the one or more receive routers 208 and the one or more transmit routers 206, when the layer_position field holds the value bottom. The is_active field holds values 0 or 1 to indicate whether the layer block is active or passive. The dis_tx_ana_port holds 0 or 1 values to disable one or more transaction level model analysis ports on the one or more transmit routers 206. The dis_rx_ana_port holds 0 or 1 values and to enable or disable the one or more transaction level model analysis ports on the one or more receive routers 208. The dis_lat_control field holds 0 or 1 values to enable or disable the lateral controller 210 on the one or more transmit routers 206.

Figure 3:
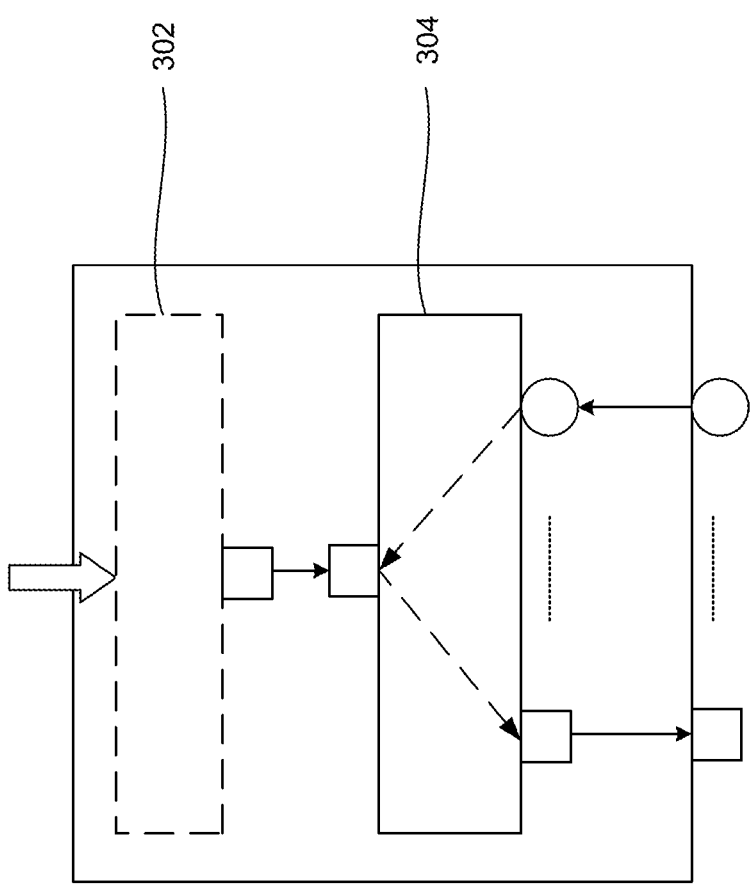
FIG. 3 illustrates a functional block diagram of a stimulus handler of FIG. 2 based on a universal verification methodology sequence or an open verification methodology sequence according to an embodiment herein.

FIG. 3 illustrates a functional block diagram of the stimulus handler 204 of FIG. 2 based on open verification methodology or universal verification methodology according to an embodiment herein. The stimulus handler 204 obtains one or more input stimulus transactions from the stimulus generator 108 and drives the one or more input stimulus transactions into the layer block. The stimulus handler 204 is enabled when the layer block functions as the top most layer block 102A. The stimulus handler 204 includes a stimulus sequencer 302, and a stimulus driver 304. The stimulus sequencer 302 includes least one of (i) transaction level model first in first out queue structure or (ii) an open verification methodology sequencer/universal verification methodology sequencer when respective verification methodologies are used. The stimulus sequencer 302 obtains at least one of (i) the input stimulus transactions or (ii) the open verification methodology sequence/universal verification methodology sequence. The stimulus driver 304 obtains the one or more input stimulus transactions from at least one of (i) the transaction level model first in first out queue structure or (ii) the open verification methodology sequencer/universal verification methodology sequencer and drives the one or more input stimulus transactions into the one or more transaction level model ports as per the implementation of the layer core 202.

Figure 4:
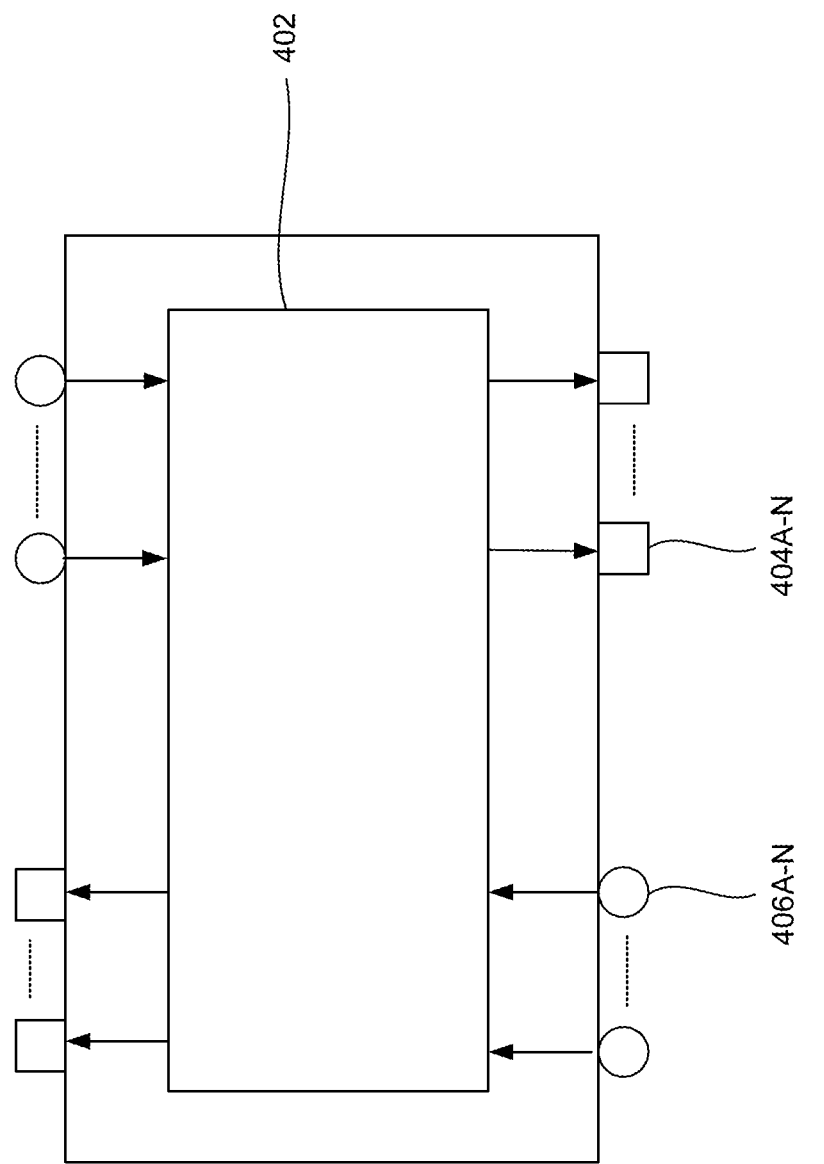
FIG. 4 illustrates an implementation of a layer core of FIG. 2 according to an embodiment herein.

FIG. 4 illustrates an implementation of the layer core 202 of FIG. 2 according to an embodiment herein. The layer core 202 implements the complete functionality of the layer block. The layer core 202 includes one or more blocking transaction level model ports 404A-N, and one or more blocking transaction level model port implementations 406A-N. The one or more of blocking transaction level model ports 404A-N output one or more transmit core transactions from the layer core 202 to at least one of (i) the one or more transmit routers 206 and (ii) a preceding layer block. The one or more blocking transaction level model port implementations 406A-N input one or more receive core transactions into the layer core 202 from at least one of (i) the one or more receive routers 208 and (ii) the stimulus handler 204 or (iii) a preceding layer block.

Figure 5:
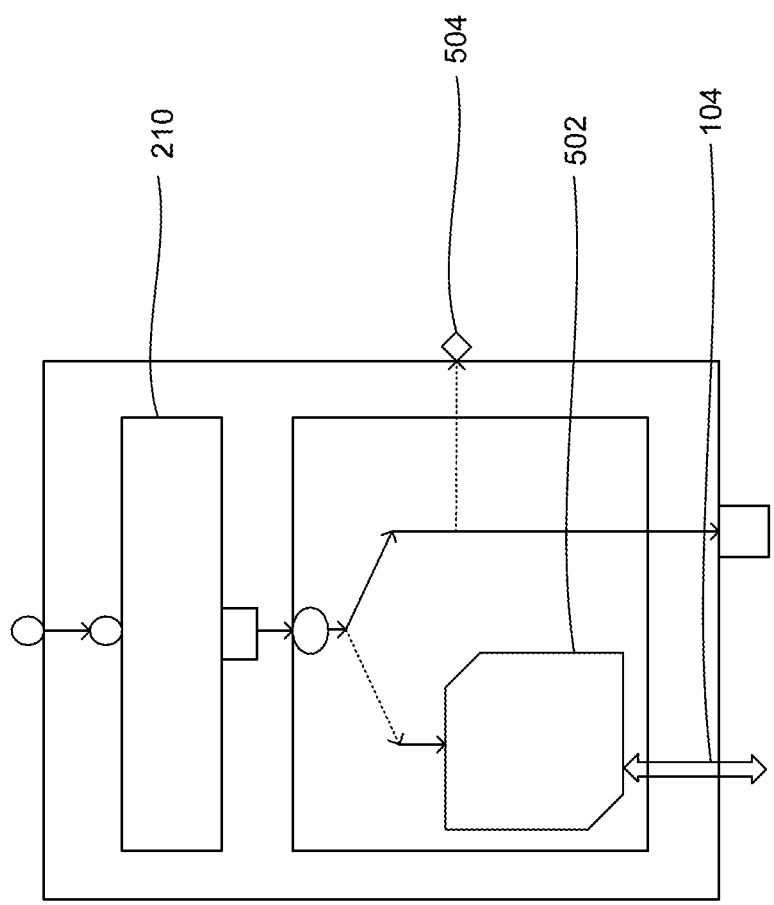
FIG. 5 illustrates an implementation of a transmit router of FIG. 2 according to an embodiment herein.

FIG. 5 illustrates an implementation of a transmit router of the one or more transmit routers 206 of FIG. 2 according to an embodiment herein. The transmit router routes the one or more transmit core transaction to a succeeding layer block and to the transaction level model analysis port for the passive subscribers. The transmit router includes a lateral controller 210 and a transmit procedure 502. The transmit procedure 502 drives signals on the design under test interface 104. The transmit router directly controls output of the one or more transmit core transactions to the succeeding layer block, through the lateral controller 210. The transmit router either routes the output of the one or more transmit core transactions to design under test interface 104 at a signal level or to the one or more blocking transaction level model ports based on the configuration of the layer block. The transmit procedure 502 receives a handle of the one or more transmit out transactions from the lateral controller 210 as input and converts the one or more transmit out transactions into signal level transitions on a design under test interface 104. The transmit router further includes one or more transmit blocking transaction level model port implementation, one or more transmit blocking transaction level model port, one or more transmit transaction level model analysis ports and a transmit configuration mechanism. The one or more transmit blocking transaction level model port implementations inputs the one or more transmit core transactions from the layer core 202 that is connected to the transmit router. The one or more transmit blocking transaction level model port outputs the one or more transmit out transactions from the lateral controller 210 to a layer block that is below the layer block (i.e. the succeeding layer block). The one or more transmit transaction level model analysis ports 504 outputs the one or more transmit out transactions to the passive subscribers connected to the transmit router. The transmit configuration mechanism includes three configuration fields, a first transmit configuration field, a second transmit configuration field and a third transmit configuration field. The first transmit configuration field enables transmitting the one or more transmit out transactions in at least one of (i) the signal level or (ii) the transaction level and disables the one or more transmit blocking transaction level model port and enables the design under test interface 104 respectively. The second transmit configuration field enables or disables the one or more transmit transaction level model analysis port. The third transmit configuration field enables or disables the lateral controller 210.

Figure 6:
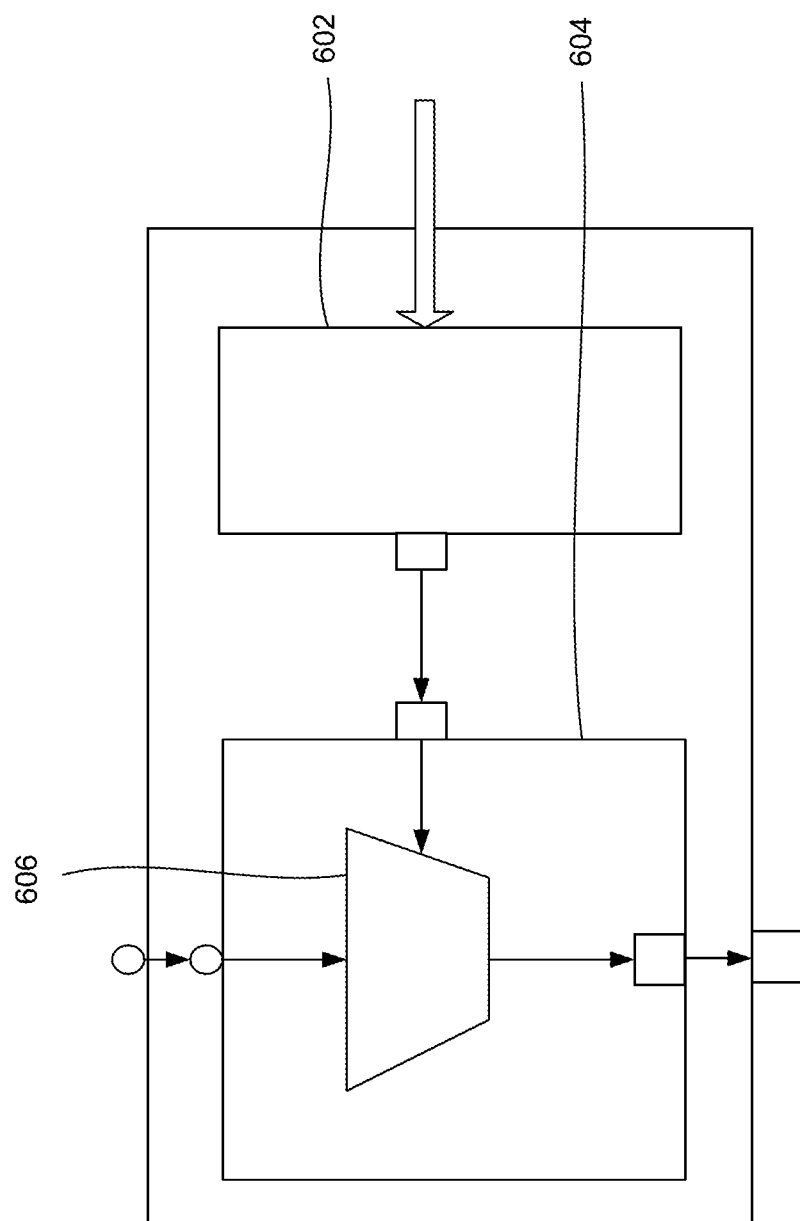
FIG. 6 illustrates an implementation of a lateral controller of FIG. 2 according to an embodiment herein.

FIG. 6 illustrates an implementation of lateral controller 210 of FIG. 2 according to an embodiment herein. The lateral controller 210 includes a lateral stimulus sequencer 602, a lateral stimulus driver 604 and lateral operator 606. The lateral stimulus sequencer 602 obtains one or more lateral transactions into the layer block. The lateral stimulus sequencer 602 includes least one of (i) the lateral transaction level model first in first out queue structure or (ii) the lateral open verification methodology sequencer/universal verification methodology sequencer. The lateral stimulus sequencer 602 obtains at least one of (i) the one or more lateral transactions or (ii) the lateral open verification methodology/universal verification methodology sequences. The lateral stimulus driver 604 obtains the one or more lateral transactions from at least one of (i) the lateral transaction level model first in first out queue structure or (ii) the lateral open verification methodology sequencer/universal verification methodology sequencer and drives the one or more lateral transactions into the lateral operator 606. The lateral controller 210 enables performing the lateral operator 606 (i.e. controlling or modifying the output traffic of the layer block laterally before sending to the succeeding layer block). The lateral controller 210 further enables error injections for generating desired test scenarios. The lateral controller 210 obtains two inputs one through the blocking transaction level model port implementations and another from at least one of (i) the lateral transaction level model first in first out queue structure or (ii) the lateral open verification methodology sequencer/universal verification methodology sequencer. The one or more blocking transaction level model port implementation obtains the one or more transmit core transactions of the layer core 202. The lateral transaction level model first in first out queue structure or the lateral open verification methodology sequencer or universal verification methodology sequencer obtains the one or more lateral transactions (or Lateral Operator Sequence Item). The lateral controller 210 performs the lateral operator 606 before providing output to the succeeding layer block. The lateral operator 606 includes an insert operation, a replace operation and a drop operation. The insert operation inserts one of the lateral transactions in between a stream of the one or more transmit core transactions of the output traffic of the layer block. The replace operation replaces at least one of the transmit core transactions in the output traffic of the layer block with the one of the lateral transactions. The drop operation drops at least one of the transmit core transactions in the output traffic of the layer block. The lateral controller 210 performs the lateral operator 606 using at least one of control fields of the lateral transactions (or lateral operator sequence item). The control fields include an m_operation_type field, an m_reference_core_txn field, an m_relative_pos field, and an m_lateral_transaction field. The m_operation_type control field indicates type of operation to be performed and holds values insert, replace and drop. The m_reference_core_txn field and the m_relative_pos field together provide the relative position with respect to the transmit core transaction where the operation should be performed. The m_reference_core_txn field indicates name of the transmit transactions with respect to the type of operation performed within the stream of the one or more transmit core transactions. The m_reference_core_txn field holds string values matching all the possible names of the one or more transmit core transactions or null string. (For instance, "data", "control", "start of frame", "end of frame" etc dependent on the protocol). The m_relative_pos field indicates the relative position with respect to the m_reference_core_txn field at which the type of operation should be performed. The m_relative_pos field holds value from −1 to any positive integer, where the −1 is a special value indicating the position just before the m_reference_core_txn, if it is not a null string. In an embodiment, the m_reference_core_txn field is a null string then −1 indicates the current position at which the lateral operator transaction has been received by the lateral controller 210 within the stream of the one or more transmit core transactions and other values indicate the relative position from the current position. The m_lateral_transaction field holds the one or more lateral transactions to be inserted or replaced with, within the stream of the one or more transmit core transactions.

Figure 7:
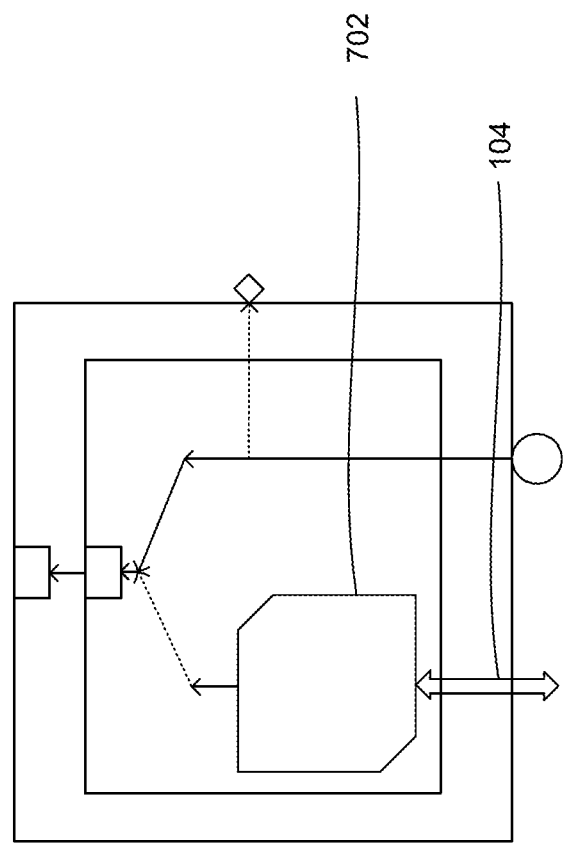
FIG. 7 illustrates an implementation of a receive router of FIG. 2 according to an embodiment herein.

FIG. 7 illustrates an implementation of a receive router of the one or more receive routers 208 of FIG. 2 according to an embodiment herein. The receive router routes at least one of (i) receive input transaction or (ii) signal level transitions from a design under test interface 104, to the layer core 202 when lower layer is the design under test interface 104, to (i) the layer core 202 and to (ii) a receive transaction level model analysis port for the passive subscribers. The receive router either routes from the design under test interface 104 or from the blocking transaction level model implementations based on the configuration of the layer block. The receive router includes a receive blocking transaction level model port implementation, a receive blocking transaction level model port, the receive transaction level model analysis port, and a receive procedure 702. The receive blocking transaction level model port implementation inputs the one or more receive core transactions from the connected succeeding layer block. The receive blocking transaction level model port outputs the one or more receive core transactions to the connected layer core 202. The receive transaction level model analysis port broadcasts the one or more receive core transactions to the connected passive subscribers. The receive procedure 702 obtains the design under test interface 104 as input and converts the transitions of the design under test interface 104 to the one or more receive core transactions. The receive router further includes a receive configuration mechanism. The receive configuration mechanism includes a first receive configuration field and a second receive configuration field. The first receive configuration field enables receiving the one or more receive core transactions from the design under test interface 104 or from the transaction level. The first receive configuration field further disables the receive blocking transaction level model port implementation and enables the receive procedure 702 respectively. The second receive configuration field enables or disables the receive transaction level model analysis port.

Figure 8:
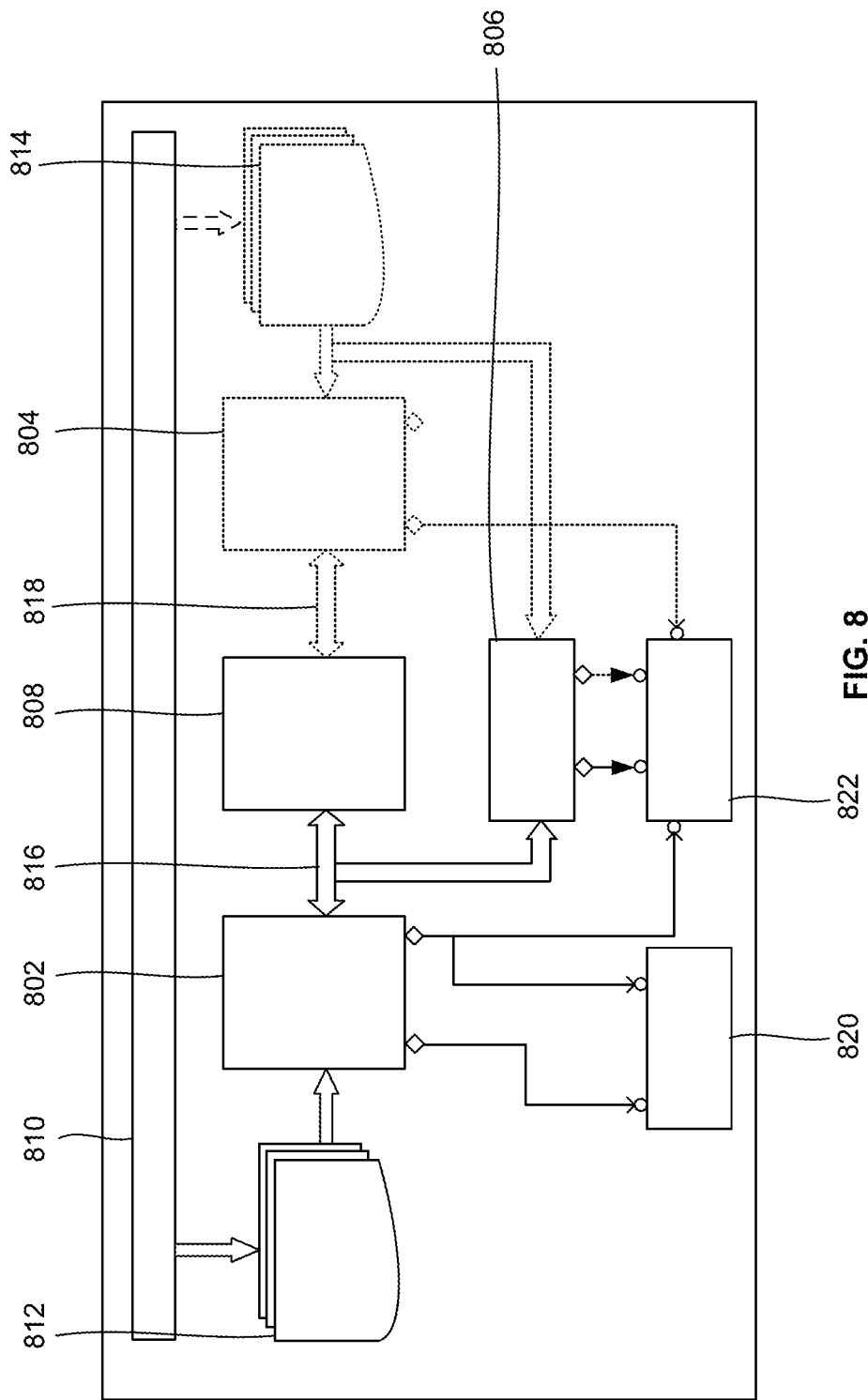
FIG. 8 illustrates a verification test bench implementation using the verification IP for the layered protocol, according to an embodiment herein.

FIG. 8 illustrates a verification test bench implementation using the verification IP of a layered protocol, according to an embodiment herein. The verification test bench implementation includes a first layered verification IP 802, a second layered verification IP 804, a third layered verification IP 806, a design under test 808, a stimulus generator 810, one or more first stimulus sequences 812, one or more second stimulus sequences 814, a first design under test interface 816, a second design under test interface 818, a coverage collector 820 (i.e. the passive subscriber) and a score board 822 (i.e. the passive subscriber). The first layered verification IP 802 models the complete layered protocol. The first layered verification IP 802 in which a top most layer block is connected to a first stimulus generator and a bottom most layer block is connected to a signal level interface of design under test 808 exposed by the bottom most layer block of the design under test 808. The design under test 808 is the layered protocol design to be verified. The design under test 808 that includes all the layers of the layered protocol or partial stack with a sub-set of one or more layers (i.e. top most layer of the design under test 808 may be one of the middle Layer of the Layered Protocol). The third layered verification IP 806 models the complete layered protocol and functions in passive mode (i.e. only receive paths from both top layer block and bottom layer blocks enabled). The third layered verification IP 806 has same configurations as design under test 808. In an embodiment, the top most layer block of the third layered verification IP 806 is connected to a second stimulus generator, when the design under test 808 is a partial stack, else is left unconnected with blocking transaction level model implementation of top most layer disabled. The receive path of the bottom most layer block is connected to the second design under test interface 818. The second layered verification IP 804 models the preceding layer blocks of the layered protocol that can connect to the top most layer of the design under test 808. The top most layer of the second layered verification IP 804 is connected to the second stimulus generator and the bottom most layer block is connected to signal level of the design under test 808 exposed by the top most layer block of the design under test 808. The scoreboard 822 includes first transaction level model port implementations and second transaction level model port implementations. The first transaction level model port implementations and the second transaction level model port implementations (i) receive expected transactions from transmit router of a layer block of the third layered verification IP and (ii) receive observed design under test transactions from receive router of the layer block of the first layered verification IP 802, the layer block position being the same as the one from which expected transactions are obtained. In an embodiment, the scoreboard 822 exposes third transaction level model analysis port implementations and fourth transaction level model analysis port implementations. The third transaction level model analysis implementations connects to one of the middle layer blocks of the third layered verification IP 806 (that matches bottom most layer of the second layered verification 804) receive router's transaction level model analysis port and the fourth transaction level model analysis port implementations connects to the second layered verification IP 804 bottom most layer block's receive router's transaction level model analysis port, when the design under test 808 is a partial stack, to compare expected and observed behavior on the design under test's 808 top most layer side. The coverage collector 820 includes transaction level model analysis ports corresponding to every layer that needs to be observed for coverage and connects to the transaction level model analysis ports of corresponding layer blocks part of the first layered verification IP 802.

The verification test bench implementation further includes a verification IP configuration class. The verification IP configuration class includes a top_layer_id field, a bottom_layer_id field, an is_active field, a dis_tx_ana_port [layer id] field, a dis_rx_ana_port [layer id] field, and a dis_lat_control [layer id] field. The top_layer_id field holds a layer id of the top most layer block 102A. The top_layer_id field sets the configuration of the layer position of the layer block based on the layer id of the top most layer block 102A. The bottom_layer_id field holds the layer id of the bottom most layer block 102N. The bottom_layer_id field sets the configuration of the layer position of the layer block based on the layer id of the bottom most layer block 102N. The is_active field indicates whether the verification IP is passive or active. The is_active field holds the values 0 or 1. In an embodiment, the serially connected layer blocks 102A-N in the Verification IP are set to 0 and vice versa, when the is active field is set to 0. The dis_tx_ana_port [layer id] field holds values 0 or 1 and disables the transaction level model analysis ports on the one or more transmit router 206A-N of the layer block pointed by the layer id. The dis_rx_ana_port [layer id] field holds values 0 or 1 and disables the transaction level model analysis ports on the on the one or more receive router 208A-N of the layer block pointed by the layer id. The dis_lat_control [layer id] field holds values 0 or land disables the lateral controller 210 on the one or more transmit router 206A-N of the layer block pointed by the layer id.

Figure 9A:
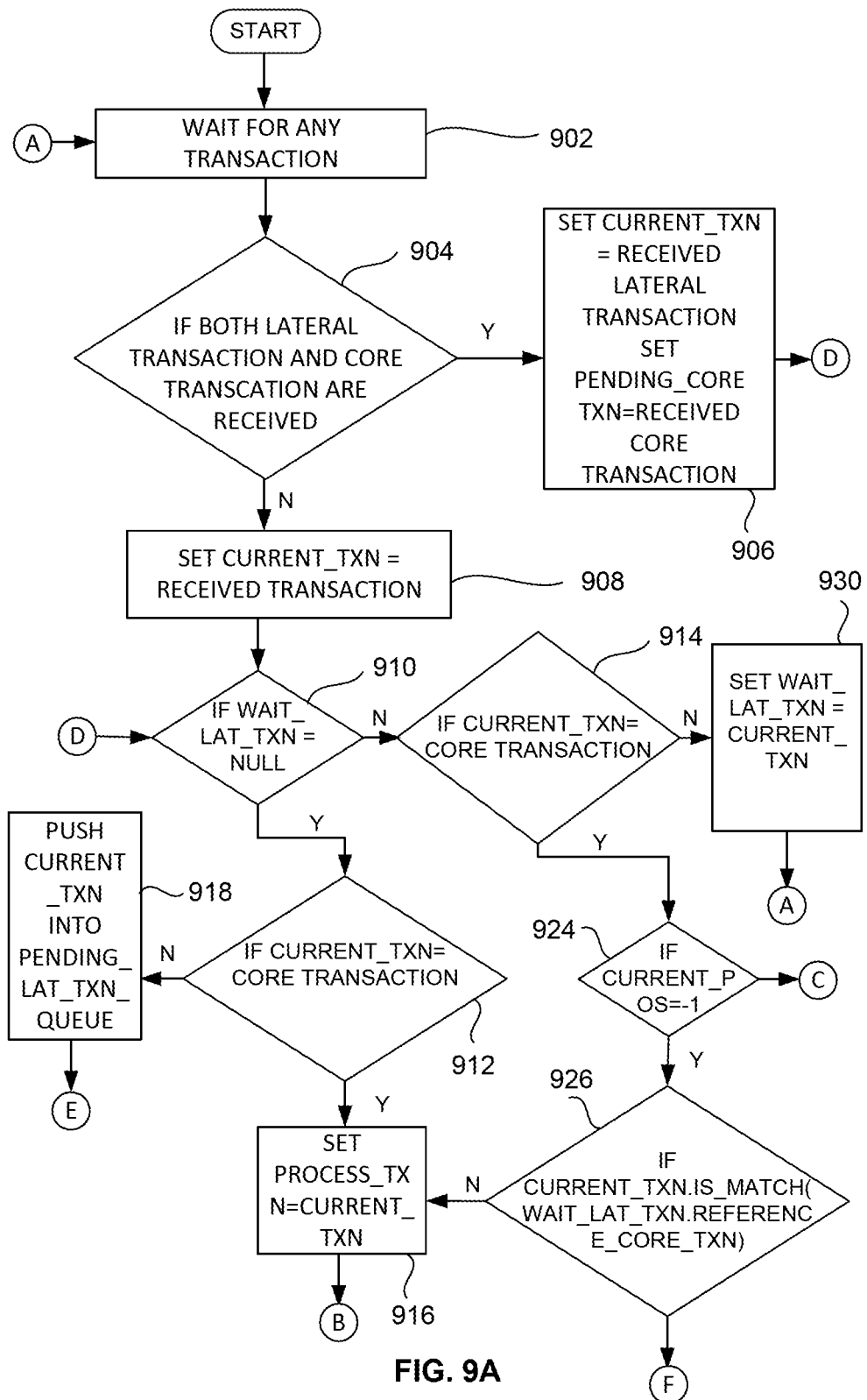
FIG. 9A-9B-9C is a flowchart that illustrates a procedure followed by the lateral controller for performing the lateral operations, according to an embodiment herein.
Figure 9B:
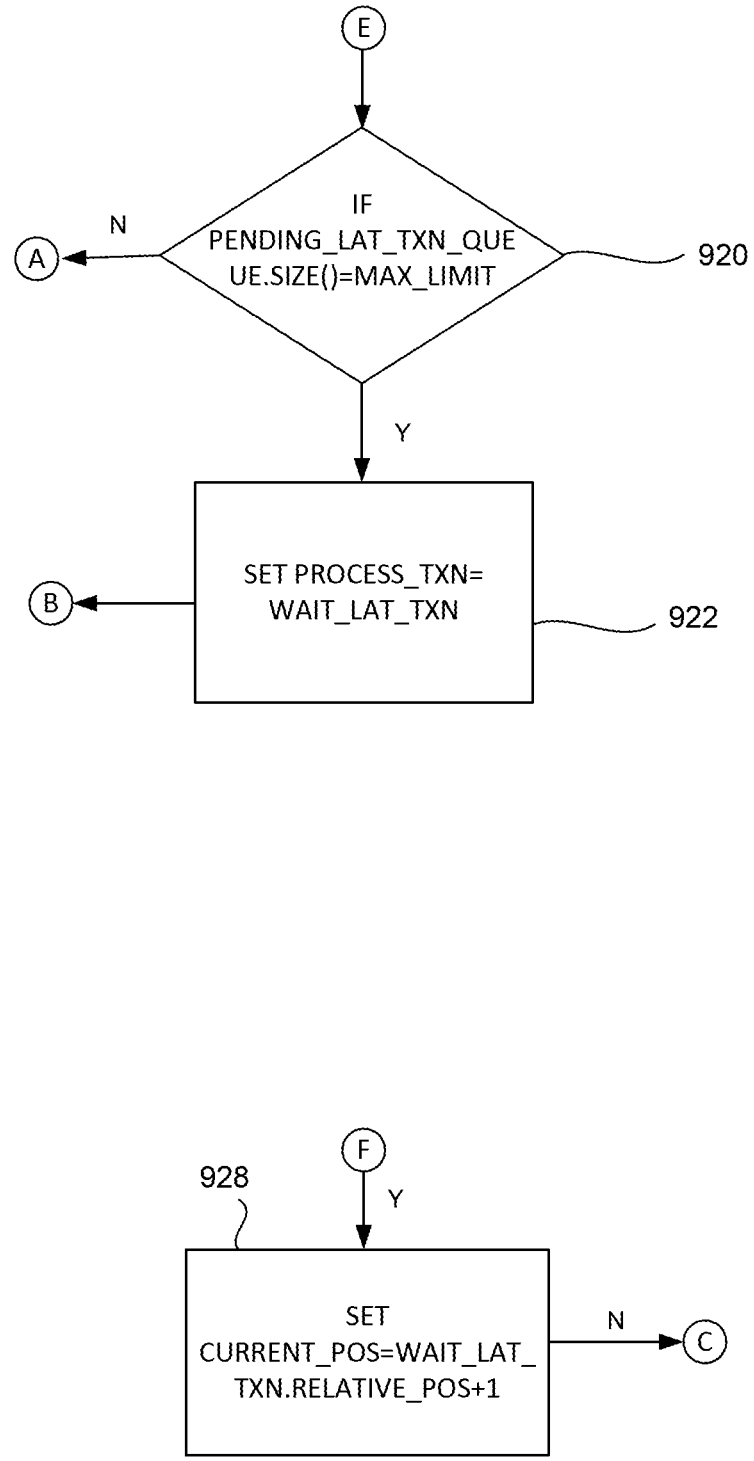
Figure 9C:
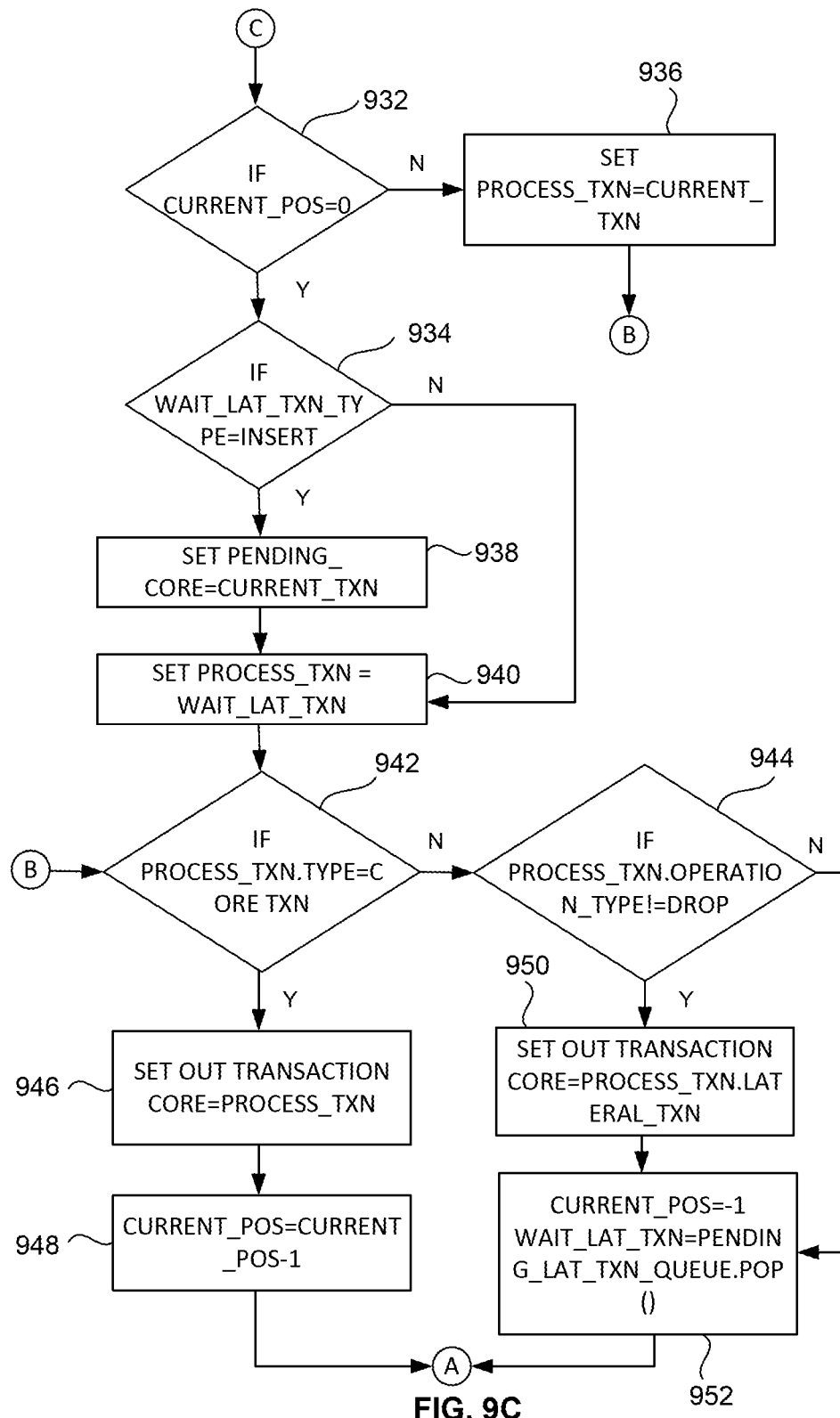

FIG. 9A-9B-9C is a flowchart that illustrates a procedure followed by the lateral controller 210 for performing the lateral operations, according to an embodiment herein. At step 902, a lateral operation procedure is waiting for at least one transaction from either a layer core (i.e. core transaction) or from a lateral sequencer (i.e. lateral transaction). At step 904, the lateral operation procedure is verifying whether lateral transaction and core transaction are received at the same time. At step 906, setting current_txn equal to received lateral transaction and setting pending_core_txn equal to received core transaction, when both the lateral transaction and core transaction are received. At step 908, setting current_txn equal to received transaction, when either the lateral transaction or core transaction is received. At step 910, verifying wait_lat_txn is equal to null. At step 912, if the wait_lat_txn is equal to null, then verifying current_txn is equal to core transaction. At step 914, verifying current_txn equal to core transaction, when the wait_lat_txn is not equal to null. At step 916, setting process_txn equal to current_txn when the current transaction equal to the core transaction. At step 918, pushing current_txn into pending_lat_txn queue, when the current transaction not equal to the core transaction. At step 920, verifying pending_lat_txn queue's size equals max_limit, which is the configurable max size set for the pending_lat_txn queue's size. At step 922, setting process_txn equal to wait_lat_txn, when the pending_lat_txn queue's size equals max_limit. If the pending_lat_txn queue's size does not equal the max_limit, then proceeding from step 902. At step 924, verifying current pos equals −1, when the current transaction equal to the core transaction, which indicates that current position is still at reset and not yet initialized. At step 926, verifying current_txn matches wait_lat_txn.reference_core_txn, when the current pos equals −1 is performed to verify if reference core transaction has arrived for starting relative position counter. At step 928, setting current_pos equal to wait_lat_txn.relative_pos+1, when the condition current_txn matches wait_lat_txn.reference_core_txn evaluates to yes. At step 930, setting wait_lat_txn equal to current_txn and proceeding from the step 902, when the current_txn not equal to the core_txn. At step 932, verifying current_pos=0, when current_pos not equal to −1 to indicate that relative position for performing lateral operation is reached. At step 934, verifying wait_lat_txn type equal to insert, when current_pos equal to 0. At step 936, setting process_txn=current_txn, when current_pos not equal to 0. At step 938, setting pending core equal to current_txn, when wait_lat_txn type equal to insert. At step 940, setting process_txn equal to wait_lat_txn, when wait_lat_txn type not equal to insert. At step 942, verifying process_txn's type equal to core txn. At step 944, verifying process_txn's operation type not equal to drop, when process_txn's type not equal to core txn. At step 946, setting out transaction core equal to process_txn, when process_txn.type equal to core txn. At step 948, current_pos equal to current_pos−1 and then proceeds from step 902. At step 950, setting out transaction core equal to process_txn, when process_txn.operation_type not equal to drop. At step 952, resetting current_pos=−1 and setting wait_lat_txn=pending_lat_txn_queue.pop ( ), when process txn's operation type is equal to drop or after finishing step 950.

Figure 10:
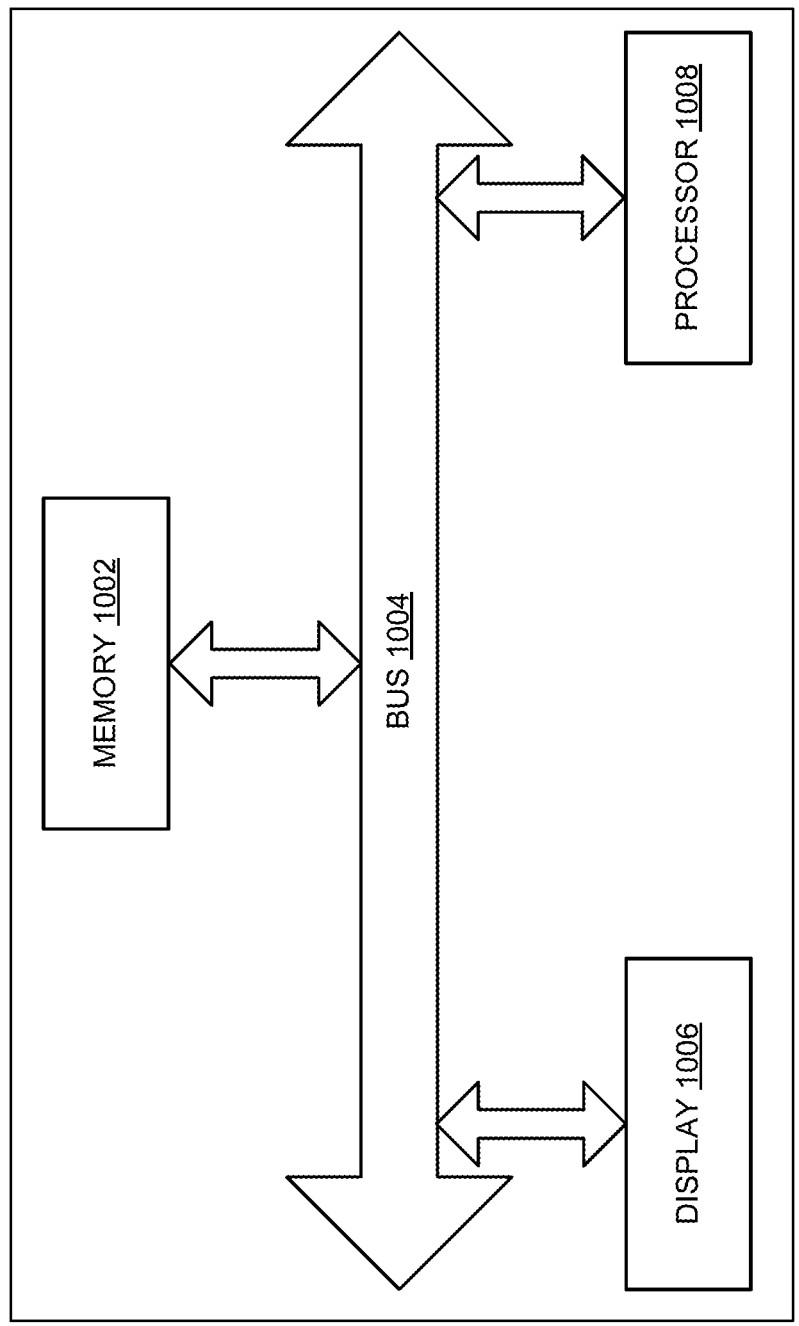
FIG. 10 illustrates an exploded view of a personal communication device according to the embodiments herein.

FIG. 10 illustrates an exploded view 1000 of a personal communication device having a memory 1002 having a set of computer instructions, a bus 1004, a display 1006, and a processor 1008 capable of processing a set of instructions to perform any one or more of the methodologies herein, according to an embodiment herein. In one embodiment, the receiver may be the personal communication device. The processor 1008 may also enable digital content to be consumed in the form of video for output via one or more displays 1006 or audio for output via speaker and/or earphones 1008. The processor 1008 may also carry out the methods described herein and in accordance with the embodiments herein.

Digital content may also be stored in the memory 1002 for future processing or consumption. The memory 1002 may also store program specific information and/or service information (PSI/SI), including information about digital content (e.g., the detected information bits) available in the future or stored from the past. A user of the personal communication device may view this stored information on display 1006 and select an item of for viewing, listening, or other uses via input, which may take the form of keypad, scroll, or other input device(s) or combinations thereof. When digital content is selected, the processor 1008 may pass information. The content and PSI/SI may be passed among functions within the personal communication device using the bus 1004.

The design under test verified by the techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The design under test verified by the embodiments herein can take the form of, an entirely hardware embodiment, an entirely software embodiment or an embodiment including both hardware and software elements. The design under test verified by the embodiments that are implemented in software include but are not limited to, firmware, resident software, microcode, etc. Furthermore, the design under test verified by the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 11:
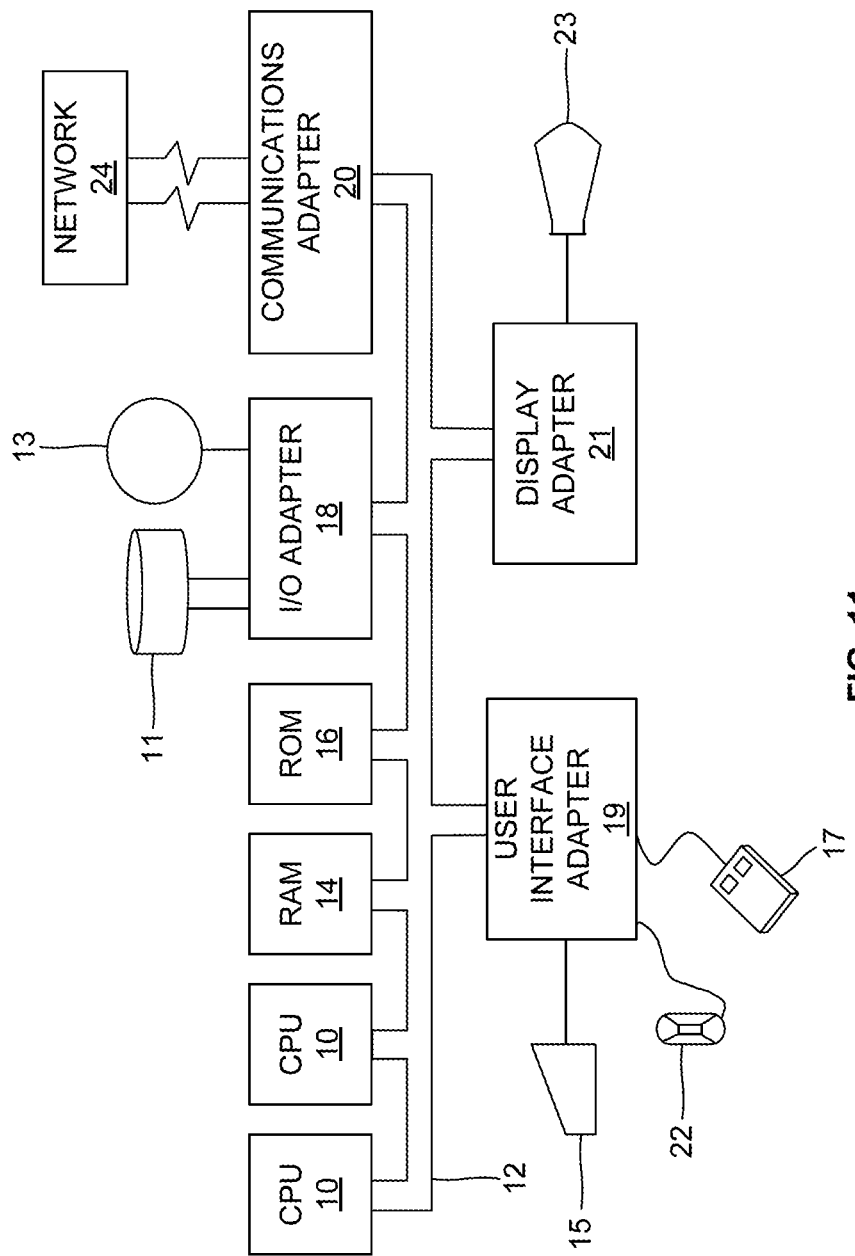
FIG. 11 illustrates a schematic diagram of computer architecture of a user device or a server, in accordance with the embodiments herein.

A representative hardware environment for practicing the embodiments herein is depicted in FIG. 11. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, microphone 22, and/or other user interface devices such as a touch screen device (not shown) or a remote control to the bus 12 to gather user input. Additionally, a communication adapter 20 connects the bus 12 to a data processing network 24, and a display adapter 21 connects the bus 12 to a display device 23 which may be embodied as an output device such as a monitor, printer, or transmitter, for example.

The method for implementing the verification IP enables configurability of the layer block to implement the functionality of the layer of the layered protocol. The method provides scalable construction to scale down the layered verification IP structure to any subset of layers of the layered protocol. The method further enables to control or modify the output traffic directly at each layer.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

We claim:

1. A method for implementing verification IP for pre-silicon functional verification of a layered protocol, wherein said method comprises:
    generating serially connected layer blocks, wherein a layer block of said serially connected layer blocks implements a functionality of a layer of said layered protocol, wherein said serially connected layer blocks are configurable to scale down to any subset of layers of said layered protocol, wherein an output traffic of said layer block is configured to be controlled or modified directly at said layer, wherein said layer block comprises modular components that may be enabled or disabled to change a functionality of said layer block, wherein said modular components comprise:
    a layer core, wherein said layer core implements the complete functionality of said layer block;
    a stimulus handler, wherein said stimulus handler drives one or more input stimulus transactions into said layer core of said layer block, wherein said one or more input stimulus transactions are output transactions from said stimulus handler to said layer core;
    one or more transmit routers, wherein said one or more transmit routers routes one or more transmit core transactions from said layer core to a connected succeeding layer block, wherein said one or more transmit core transactions are transactions from said layer core to said one or more transmit routers; and
    one or more receive routers, wherein said one or more receive routers routes one or more receive core transactions from said succeeding layer block to said layer core, wherein said one or more receive core transactions are transactions from said succeeding layer block to said one or more receive routers,
    wherein a stimulus generator provides at least one of (i) said one or more input stimulus transactions or (ii) a universal verification methodology sequence or an open verification methodology sequence to said layered protocol; and a lateral stimulus generator provides at least one of (i) one or more lateral transactions or (ii) a universal verification methodology lateral sequence or an open verification methodology lateral sequence to said layered protocol;
    wherein said verification IP comprises a scalable construction that is configured to:
    enable or disable at least one layer block of said serially connected layer blocks individually;
    enable any one layer block of said serially connected layer blocks to function as a bottom most layer block, wherein said bottom most layer block is connected to a design under test interface, wherein said bottom most layer block drives outputs and receives inputs at a signal level;
    enable any one layer block of said serially connected layer blocks to function as a top most layer block, wherein said top most layer block is connected to a stimulus generator; and
    enable layer blocks except said bottom most layer block and said top most layer block to function as middle layer blocks, wherein said middle layer blocks are connected to one another using one or more blocking transaction level model interfaces that are adapted to (i) drive one or more outputs and (ii) receive one or more inputs at a transaction level.

2. The method as claimed in claim 1, wherein said verification IP receives at least one of (i) said one or more input stimulus transactions or (ii) a universal verification methodology sequence or an open verification methodology sequence that comprises said one or more input stimulus transactions, at a topmost layer of said layered protocol; and receives at least one of (i) a lateral transaction or (ii) a universal verification methodology lateral sequence or an open verification methodology lateral sequence that comprises said one or more lateral transactions, at any of said layer blocks of said layered protocol, wherein said verification IP comprises said serially connected layer blocks.

3. The method as claimed in claim 2, wherein each of said one or more receive routers further comprises:
    a receive blocking transaction level model port implementation that inputs said one or more receive core transactions from said connected succeeding layer block;
    a receive blocking transaction level model port that outputs said one or more receive core transactions to said connected layer core;
    a receive transaction level model analysis port that broadcasts said one or more receive core transactions to passive subscribers that are connected to said each of said one or more receive routers;
    a receive procedure that obtains a design under test interface as input and converts said transitions of said design under test interface to said one or more receive core transactions; and
    a receive configuration mechanism that comprises
        a first receive configuration field that enables receiving said receive core transactions from said design under test interface or from said transaction level and disables said receive blocking transaction level model port implementation and enables said receive procedure respectively; and a second receive configuration field that enables or disables said receive transaction level model analysis port.

4. The method as claimed in claim 1, wherein said output traffic of said layer block is configured to be controlled or modified directly at said layer by performing said one or more lateral operations comprising:

inserting one of said one or more lateral transactions in between a stream of said one or more transmit core transactions of said output traffic of said layer block;

replacing at least one of said one or more transmit core transactions in said output traffic of said layer block with one of said one or more lateral transactions; and dropping at least one of said one or more transmit core transactions in said output traffic of said layer block.

5. The method as claimed in claim 1, wherein said verification IP is implemented using hardware verification language, wherein said hardware verification language supports object oriented programming and a verification methodology, wherein said verification methodology supports transaction level modeling as supported by at least one of a universal verification methodology or an open verification methodology.

6. The method as claimed in claim 1, wherein said layer core comprises:

a transaction level model that implements respective functions of said layer of said layered protocol;

one or more blocking transaction level model ports, wherein said one or more blocking transaction level model ports outputs said one or more transmit core transactions from said layer core of said layer block to at least one of (a) said one or more transmit routers or (b) a layer block below said layer block; and one or more blocking transaction level model port implementations, wherein said one or more of blocking transaction level model port implementations inputs said one or more receive core transactions to said layer core of said layer block from at least one of (a) said one or more receive routers or (b) said stimulus handler or (c) a layer block above said layer block of said layered protocol.

7. The method as claimed in claim 1, wherein said stimulus handler provides at least one of a universal verification methodology or an open verification methodology sequencer-driver pair based on verification methodology to drive at least one of (i) said input stimulus transaction or (ii) said universal verification methodology sequence or said open verification methodology sequence on said layered protocol.

8. The method as claimed in claim 1, wherein said one or more transmit routers routes one or more transmit core transactions from said layer core to passive subscribers.

9. The method as claimed in claim 1, wherein said one or more receive routers routes one or more receive core transactions from said succeeding layer block to passive sub scribers.

10. The method as claimed in claim 1, wherein each of said one or more transmit routers further comprises:

a transmit blocking transaction level model port implementation that inputs said one or more transmit core transactions from said layer core that is connected to said each of said one or more transmit routers;

a lateral controller that controls or modifies said output traffic of said layer block before communicating to another layer block that is below said layer block, wherein said lateral controller further comprises:

a blocking transaction level model port implementation that inputs said one or more transmit core transactions from containing said each of said one or more transmit routers;

a blocking transaction level model port that outputs one or more transmit out transactions to said each of said one or more transmit routers;

a lateral sequencer that obtains said one or more lateral transactions from said lateral stimulus generator and drives them into a lateral operator; and said lateral operator inputs said one or more lateral transactions and said one or more transmit core transactions and performs lateral operations based on operation type and reference position provided as part of said one or more lateral transactions; and a transmit blocking transaction level model port that outputs said one or more transmit out transactions from said lateral controller to said another layer block that is below said layer block that includes said each of said one or more transmit routers;

a transmit transaction level model analysis port that outputs said one or more transmit out transactions to passive subscribers connected to said each of said one or more transmit routers; and a transmit procedure that receives a handle of said one or more transmit out transactions from said lateral controller as input and converts said one or more transmit out transactions into signal level transitions on a design under test interface; and a transmit configuration mechanism that comprises a first transmit configuration field that enables transmitting said one or more transmit out transactions in at least one of (i) a signal level or (ii) a transaction level, and disables said blocking transaction level model port and enables said design under test interface respectively;

a second transmit configuration field that enables or disables said transmit transaction level model analysis port; and a third transmit configuration field that enables or disables said lateral controller.

11. A verification IP system for pre-silicon functional verification of a layered protocol, the verification IP system comprising:

a memory and a processor that is configured to execute serially connected layer blocks, wherein a layer block of said serially connected layer blocks implements a functionality of a layer of said layered protocol, wherein said layer block comprises modular components that are enabled or disabled to change a functionality of said layer block, wherein said modular components comprise:

a layer core that implements a complete functionality of said layer block;

a stimulus handler that drives one or more input stimulus transactions into said layer core of said layer block, wherein said input stimulus transactions are output transactions from said stimulus handler to said layer core;

one or more transmit routers, wherein said one or more transmit routers routes transmit core transactions from said layer core to a connected succeeding layer block, wherein said one or more transmit core transactions are transactions from said layer core to said one or more transmit routers, wherein said transmit router comprises:
  a lateral controller that controls or modifies output traffic of said layer block before communicating to a layer block that is below said layer block; and
  one or more receive routers, wherein said one or more receive routers routes one or more receive core transactions from said succeeding layer block to said layer core, wherein said one or more receive core transactions are transactions from said succeeding layer block to said one or more receive routers,
  wherein a stimulus generator provides at least one of (i) said one or more input stimulus transactions or (ii) a universal verification methodology sequence or an open verification methodology sequence to said layered protocol; and a lateral stimulus generator provides at least one of (i) one or more lateral transactions or (ii) a universal verification methodology lateral sequence or an open verification methodology lateral sequence to said layered protocol,
wherein said verification IP comprises a scalable construction that is configured to:
enable or disable at least one layer block of said serially connected layer blocks individually;
enable any one layer block of said serially connected layer blocks to function as a bottom most layer block, wherein said bottom most layer block is connected to a design under test interface, wherein said bottom most layer block drives outputs and receives inputs at a signal level;
enable any one layer block of said serially connected layer blocks to function as a top most layer block, wherein said top most layer block is connected to a stimulus generator; and
enable layer blocks except said bottom most layer block and said top most layer block to function as middle layer blocks, wherein said middle layer blocks are connected to one another using one or more blocking transaction level model interfaces that are adapted to (i) drive one or more outputs and (ii) receive one or more inputs at a transaction level.

12. A non-transitory computer readable storage medium storing one or more sequences of instructions, which when executed by one or more processors, causes the one or more sequences of instructions to execute a process, the one or more sequences of instructions comprising: implementing a verification IP for pre-silicon functional verification of a layered protocol, by generating serially connected layer blocks, wherein a layer block of said serially connected layer blocks implements a functionality of a layer of said layered protocol, wherein said serially connected layer blocks are configurable to scale down to any subset of layers of said layered protocol, wherein an output traffic of said layer block is controlled or modified directly at the said layer block, wherein said layer block comprises modular components that are enabled or disabled to change a functionality of said layer block, wherein said modular components comprise:
  a layer core, wherein said layer core implements a complete functionality of said layer block;
  a stimulus handler, wherein said stimulus handler drives one or more input stimulus transactions into said layer core of said layer block, wherein said input stimulus transactions are output transactions from said stimulus handler to said layer core;
  one or more transmit routers, wherein said one or more transmit routers routes one or more transmit core transactions from said layer core to a connected succeeding layer block and passive subscribers, wherein said one or more transmit core transactions are transactions to said one or more transmit routers, wherein said transmit router comprises a lateral controller that controls or modifies said output traffic of said layer block before communicating to a layer block that is below said layer block; and
  one or more receive routers, wherein said one or more receive routers routes one or more receive core transactions from said succeeding layer block to said layer core, wherein said one or more receive core transactions are transactions from said succeeding layer block to said one or more receive routers,
  wherein a stimulus generator provides at least one of (i) said one or more input stimulus transactions or (ii) a universal verification methodology sequence or an open verification methodology sequence to said layered protocol; and a lateral stimulus generator provides at least one of (i) one or more lateral transactions or (ii) a universal verification methodology lateral sequence or an open verification methodology lateral sequence to said layered protocol;
wherein said verification IP comprises a scalable construction that is configured to:
enable or disable at least one layer block of said serially connected layer blocks individually;
enable any one layer block of said serially connected layer blocks to function as a bottom most layer block, wherein said bottom most layer block is connected to a design under test interface, wherein said bottom most layer block drives outputs and receives inputs at a signal level;
enable any one layer block of said serially connected layer blocks to function as a top most layer block, wherein said top most layer block is connected to a stimulus generator; and
enable layer blocks except said bottom most layer block and said top most layer block to function as middle layer blocks, wherein said middle layer blocks are connected to one another using one or more blocking transaction level model interfaces that are adapted to (i) drive one or more outputs and (ii) receive one or more inputs at a transaction level.

* * * * *